United States Patent Office 3,000,900
Patented Sept. 19, 1961

3,000,900
2,6-DI-t-BUTYL-4-(N-MALEIMIDO-METHYL)-PHENOL

Pliny Otto Tawney, Passaic, N.J., assignor to United States Rubber Company, New York, N.Y., a corporation of New Jersey
No Drawing. Filed Jan. 28, 1960, Ser. No. 5,115
1 Claim. (Cl. 260—326.5)

This invention relates to a new chemical, denoted 2,6-di-t-butyl-4-(N-maleimidomethyl)-phenol, which is represented by the formula

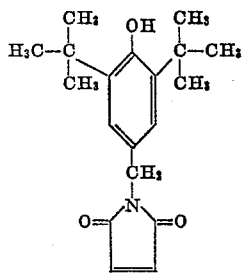

This invention also relates to the preparation of this new chemical by the Friedel-Crafts alkylation of 2,6-di-t-butyl phenol with N-(chloromethyl) maleimide.

The subject compound, 2,6-di-t-tbutyl-4-(N-maleimidomethyl)-phenol, is useful as a vulcanizing agent for SBR rubber. It may be used as a fungicide and is also copolymerizable with a variety of ethylenically unsaturated monomers, such as styrene, acrylates, methacrylates, and the like.

In accordance with the invention, 2,6-di-t-butyl-4-(N-maleimidomethyl)-phenol is prepared by alkylating 2,6-di-t-butyl phenol with N-(chloromethyl) maleimide in the presence of a catalytic amount of a "Friedel-Crafts catalyst," preferably but not necessarily, in an inert solvent such as benzene. A "Friedel-Crafts catalyst" is a powerful electrophilic reagent (an acid in the Lewis sense), such as $AlCl_3$, $FeCl_3$, $ZnCl_2$, $TiCl_4$ and the like. The amount of catlyst employed is not critical, and may range from about 0.1 percent to about 10 percent by weight of reactants, and preferably from about 1 percent to about 5 percent, depending on the strength of the catalyst, the rate of reaction desired, and so on.

The reaction may be represented as follows:

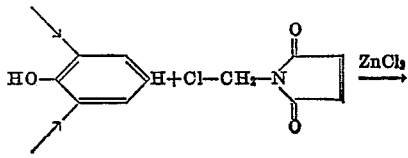

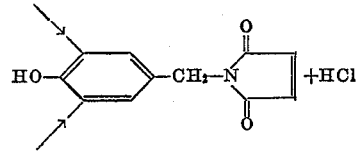

The following examples disclose the invention in more detail.

Example 1

Thirty grams of N-(chloromethyl) maleimide (made as described by Tawney, U.S. Patent No. 2,640,832) is added to 42.2 grams of 2,6-di-t-butyl phenol in 75 ml. benzene containing 1.5 grams zinc chloride. The reaction mixture is stirred and refluxed under a stream of nitrogen for 9 hours. The mixture is concentrated to dryness and the solid product recrystallized from methanol to yield 28 grams of 2,6-di-t-butyl-4-(N-maleimidomethyl)-phenol melting at 145–148° C. A second recrystallization from methanol raised the melting point to 151–153° C.

Analysis: Calculated for $C_{19}H_{25}NO_3$, nitrogen 4.44 percent. Found, nitrogen 4.43 percent.

Example 2

A reaction mixture consisting of 28 grams of 2,6-di-t-butyl phenol, 20 grams of N-(chloromethyl) maleimide and 0.5 gram of zinc chloride is heated for 3 hours at 65–75° C. accompanied with stirring. The mixture is allowed to cool and the product is recrystallized from methanol yielding 5.6 grams of 2,6-di-t-butyl-4-(N-maleimidomethyl)-phenol. After three recrystallizations the melting point of the product is raised from 134–141° C. to 151–152° C.

Analysis: Calculated for $C_{19}H_{25}NO_3$, nitrogen 4.44 percent. Found, nitrogen 4.43 percent.

Having thus described my invention, what I claim and desire to protect by Letters Patent is:

2,6-Di-t-butyl-4-(N-maleimidomethyl)-phenol.

References Cited in the file of this patent

UNITED STATES PATENTS 2,882,319    Hotelling et al. _____ Apr. 14, 1959

OTHER REFERENCES

Malchick et al.: J. Am. Chem. Soc., vol. 81, pages 2119–22 (1959).